United States Patent Office 3,433,678
Patented Mar. 18, 1969

3,433,678
SEAWATER BATTERY HAVING MAGNESIUM OR ZINC ANODE AND MANGANESE DIOXIDE CATHODE
John B. Ockerman, St. Paul, Minn., assignor to ESB Incorporated, a corporation of Delaware
No Drawing. Filed Aug. 29, 1967, Ser. No. 663,976
U.S. Cl. 136—100
Int. Cl. H01m 11/00, 13/06
2 Claims

ABSTRACT OF THE DISCLOSURE

A battery having an anode of magnesium or zinc, a cathode of manganese dioxide, and seawater electrolyte.

Cross-reference to related application

This application is related to one entitled, "Seawater Reserve Battery Having Magnesium Anode and Lead Dioxide-Graphite Fabric Cathode." Both applications have common filing dates and common ownership.

Background of the invention

Batteries used for powering navigational aids such as buoys should meet the following requirements: (1) have high voltage; (2) be capable of being operated for long periods of time, preferably up to two years, without maintenance or replacement; (3) have relatively low cost; and, (4) fit into the limited stowage space provided in buoys. Previously known batteries have offered only a compromise between these four factors.

Air depolarized batteries offer the lowest cost system presently available, but are limited because they can provide only about 25 kilowatt hours if all available space is utilized. For two year operation at an average power output of 6 watts the energy required is approximately 100 kilowatt hours.

Another system employing lead chloride and magnesium (disclosed and claimed in "Battery Electrodes for Use in Water Electrolyte," Ser. No. 529,208, filed Feb. 23, 1966 by Joseph C. Duddy) can provide the required energy in the space available but has the disadvantage of providing low voltage (0.9 volt/cell), which makes it necessary to connect two cells in series to obtain a voltage great enough for efficient DC—DC conversion to the 12 volt DC level required by the buoy lamp. In addition, the labor cost incurred in manufacturing the plates is considerable, and thus the lead chloride-magnesium cell is more expensive than the air depolarized ones.

Departing from the subject of batteries used to power navigational aids, electrochemical systems employing (1) manganese dioxide, zinc, and a chloride electrolyte, (2) manganese dioxide, magnesium, and a halide electrolyte, and (3) manganese dioxide, zinc, and an alkaline electrolyte have been used in the field of dry cells. In each of these examples, finely divided manganese dioxide is mixed with carbon or some other conductive material to create a mix cake of low density.

Summary of the invention

This invention meets all four of the factors listed above better than do previously known batteries. Using seawater as electrolyte, a manganese dioxide-magnesium cell provides 2.0 volts per cell, and a manganese dioxide-zinc cell provides 1.5 volts per cell. A thick and very dense deposit of manganese dioxide may be used so that a cell having the desired 100 kilowatt hours at an average power of 6 watts may be built to fit into the space provided in buoys. The cost of the cells is less than that of air depolarized cells.

Description of the preferred embodiment

This invention relates to a battery having seawater electrolyte, a manganese dioxide cathode, and a magnesium or zinc anode.

The first of the four desired characteristics outlined above in the background, high voltage, is obtained by this invention. Using seawater electrolyte, the manganese dioxide-magnesium battery provides 2.0 volts/cell, while the manganese dioxide-zinc battery provides 1.5 volts/cell.

The last three desired characteristics are met simultaneously by taking advantage of a known technique of producing thick, massive, and very dense deposits of manganese dioxide. Briefly, such manganese dioxide deposits are obtained by electrodeposition of manganese dioxide, from an acid solution of manganese sulfate, onto an inert substrate such as graphite or lead. This technique is conventional in the production of the electrolytic manganese dioxide used in dry cells, but there the manganese dioxide is removed from the inert substrate, dried, ground, washed, and mixed with other substances such as natural manganese dioxide and carbon before it is used in the dry cells. Rather than removing the electrolytic manganese from the inert substrate used in the plating bath, the substrate with its deposit of manganese dioxide may simply be used as the cathode plate in the battery of the present invention. In this connection it is better not to treat the surface of the substrate (as might be done if the manganese dioxide were going to be removed) in order to get good contact between the manganese dioxide deposit and the substrate. The extremely dense manganese dioxide deposit, combined with the fact that very thick deposits may be obtained by electrodeposition if desired, make it possible to achieve a battery which has the high amounts of power desired but which will also fit within the space provided in a buoy. The electronic and ionic conductivity of the massive plate is sufficient to support the discharge rates involved in buoy lighting. The active materials for the batteries of this invention can be obtained at approximately one-half the cost of an air depolarized cell on the basis of cost per kilowatt hour.

To illustrate the utility of this invention a cell was built and discharged in seawater. The manganese dioxide electrode consisted of approximately 70 pounds of manganese dioxide deposited by the conventional electrolytic process on a graphite substrate 32 inches long, 7 inches wide, and 1.5 inches thick. The thickness of the manganese dioxide deposit was approximately 0.75 inch. The negative electrodes were cut from thick plates of magnesium. The cell operated satisfactorily at 2 volts with a power output of 4 watts.

If it is desired to eliminate the corrosion and hydrogen evolution which always accompanies the discharge of the magnesium plates, zinc may be substituted and used with the manganese dioxide in seawater. This cell is also satisfactory, but produces a lower voltage (1.5 volts/cell).

The cross-reference related application discloses and claims a reserve battery using seawater electrolyte, a magnesium anode, and a lead dioxide cathode. The lead dioxide is thinly deposited on a graphite fabric substrate.

What is claimed is:

1. A battery having a magnesium anode, a seawater electrolyte, and a cathode consisting essentially of a layer of manganese dioxide in direct contact with said electrolyte.

2. A battery having a zinc anode, a seawater electrolyte, and a cathode consisting essentially of a layer of manganese dioxide in direct contact with said electrolyte.

References Cited

UNITED STATES PATENTS

| 2,641,623 | 6/1953 | Winckler et al. | 136—102 |
| 2,897,249 | 7/1959 | Glicksman et al. | 136—102 |
| 3,189,486 | 6/1965 | Pryor et al. | 136—90 |

WINSTON A. DOUGLAS, *Primary Examiner.*

C. F. LE FEVOUR, *Assistant Examiner.*

U.S. Cl. X.R.

136—90, 102